US012655931B1

(12) United States Patent
Hickey et al.

(10) Patent No.: US 12,655,931 B1
(45) Date of Patent: Jun. 16, 2026

(54) PHONE HOLDER

(71) Applicant: YakAttack, LLC, Farmville, VA (US)

(72) Inventors: Ryan Michael Hickey, Charlottesville, VA (US); Luther Cifers, III, Farmville, VA (US); Nicholas Harold Kellogg, Amelia, VA (US); Taylor James Chandler, Farmville, VA (US)

(73) Assignee: YakAttack, LLC

( * ) Notice: Subject to any disclaimer, the term of this patent is extended or adjusted under 35 U.S.C. 154(b) by 0 days.

(21) Appl. No.: 18/786,426

(22) Filed: Jul. 26, 2024

(51) Int. Cl.
*F16M 11/04* (2006.01)
*F16M 11/14* (2006.01)

(52) U.S. Cl.
CPC ........... *F16M 11/041* (2013.01); *F16M 11/14* (2013.01)

(58) Field of Classification Search
CPC .............................. F16M 11/14; F16M 11/041
See application file for complete search history.

(56) References Cited

U.S. PATENT DOCUMENTS

| | | | | |
|---|---|---|---|---|
| 5,187,744 | A * | 2/1993 | Richter | F16M 11/041 |
| | | | | 379/426 |
| 5,788,202 | A * | 8/1998 | Richter | B60R 11/0241 |
| | | | | 224/570 |
| 5,836,563 | A * | 11/1998 | Hsin-Yung | B60R 11/0241 |
| | | | | 379/426 |
| 5,903,645 | A * | 5/1999 | Tsay | B60R 11/0241 |
| | | | | 248/316.4 |

| | | | | |
|---|---|---|---|---|
| 8,727,192 | B2 * | 5/2014 | Lai | B62J 50/225 |
| | | | | 248/316.4 |
| 8,971,959 | B2 * | 3/2015 | Hunt | F16M 13/022 |
| | | | | 455/90.3 |
| 9,470,356 | B1 * | 10/2016 | Zaloom | F16M 11/28 |
| 10,378,690 | B2 * | 8/2019 | Carnevali | F16M 11/425 |
| 10,587,739 | B2 * | 3/2020 | Ormsbee | H04M 1/04 |
| 10,663,104 | B2 * | 5/2020 | Yang | H04B 1/3877 |
| 10,702,067 | B2 * | 7/2020 | Acevedo | F16M 11/14 |
| 11,953,146 | B1 * | 4/2024 | Cifers, III | F16M 11/041 |
| 11,976,781 | B1 * | 5/2024 | Cifers, III | F16M 13/022 |
| 2013/0288743 | A1 * | 10/2013 | Hunt | F16M 11/2014 |
| | | | | 29/434 |
| 2014/0130334 | A1 * | 5/2014 | Chun | F16M 13/00 |
| | | | | 248/122.1 |
| 2014/0183238 | A1 * | 7/2014 | Lin | F16M 11/2078 |
| | | | | 224/483 |

(Continued)

*Primary Examiner* — Monica E Millner
(74) *Attorney, Agent, or Firm* — Thedford I. Hitaffer; Hitaffer, PLLC

(57) ABSTRACT

A phone holder comprises a platform supporting an articulatable member supporting an interface member that is configured to contact a phone to secure the phone in relation to the platform. The platform is displaceable in relation to a base between an inoperative position wherein the articulatable member is held in a fixed position and a second operable position wherein the articulatable member is articulated. The articulatable member is supported in relation to a rack that is driven by a pinion to articulate the articulatable member. The pinion is driven by rotating the platform in relation to a base subjacent to the platform. The platform may be normally biased downward to render the pinion inoperable against rotation. The platform may be supported by a ball that is a component part of a ball and socket configuration.

11 Claims, 8 Drawing Sheets

(56)         References Cited

U.S. PATENT DOCUMENTS

2015/0108306 A1 *    4/2015    Chuang ................. F16M 11/14
                                                    248/231.51
2015/0191124 A1 *    7/2015    Du ....................... F16M 13/022
                                                    248/205.5
2021/0109426 A1 *    4/2021    Bei ...................... G03B 17/566

* cited by examiner

PHONE HOLDER

BACKGROUND

The present invention relates to accessory mounts for vehicles, and more particularly, to a phone holder for vehicles. The phone holder is particularly useful on kayaks and similar vessels but has use in motor vehicles as well as other vehicles.

Phone holders for vehicles are well known. Such holders often have a backplate with ledge for supporting a lower end of the phone and side members that engage the sides of the phone to hold the phone against the back plate. The back plate is typically configured to be supported in some fashion in relation to vehicle. Conventional phone holder can be unreliable for holding phones or require operation for holding the phone that would be difficult to perform single-handedly. Another attribute of conventional phone holders is that the holders permit vibration of the phone, which results in undesirable noise.

A phone holder is needed that will secure a phone in a fixed position against vibration with a single-handed operation.

SUMMARY OF THE INVENTION

The present invention is directed to a phone holder comprising a platform supporting at least one articulatable member having a free end supporting an interface member. The articulatable member is operable by a single-handed operation to engage a phone to secure the phone, together with the interface member, in relation to the phone holder. Ideally, the phone holder supports the phone against vibration in relation to the phone holder, resulting in undesirable noise. The platform is displaceable in relation to a base between an inoperative position in which the articulatable member is held in a fixed position against articulation and an operable position in which the articulatable member is free to be articulated.

The phone holder may comprise two articulatable members, each having a free end supporting an interface member, wherein the articulatable members are configured to be articulated simultaneously toward each other to engage the phone, together with the interface members, to secure the phone therebetween.

The articulatable members may be each supported in relation to a linear gear that is driven by a circular gear to articulate the articulatable members. The circular gear may be driven by rotating the platform in relation to a base subjacent to the platform.

The base may be in the form of a ball mount comprising a ball extending downward in relation to the platform. The ball may be a component part of a ball joint (e.g., a ball and socket configuration).

A spring may be supported in relation to the platform to normally bias the platform to a position rendering the circular gear inoperable against rotation. The platform may be displaced against a biasing force of the spring to a position rendering the circular gear operable so that the circular gear may be rotated to drive the linear gears to articulate the articulatable members.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the phone holder will become more fully appreciated when considered in view of the accompanying drawings, in which like reference characters designate the same or similar parts and/or features throughout the several views, and wherein.

DETAILED DESCRIPTION OF THE PREFERRED EMBODIMENT

In light of the aforementioned figures, and in accordance with the adopted numbering, one may observe therein an example of a preferred embodiment of the invention, which comprises the parts and elements indicated and described in detail below.

Figure 1:
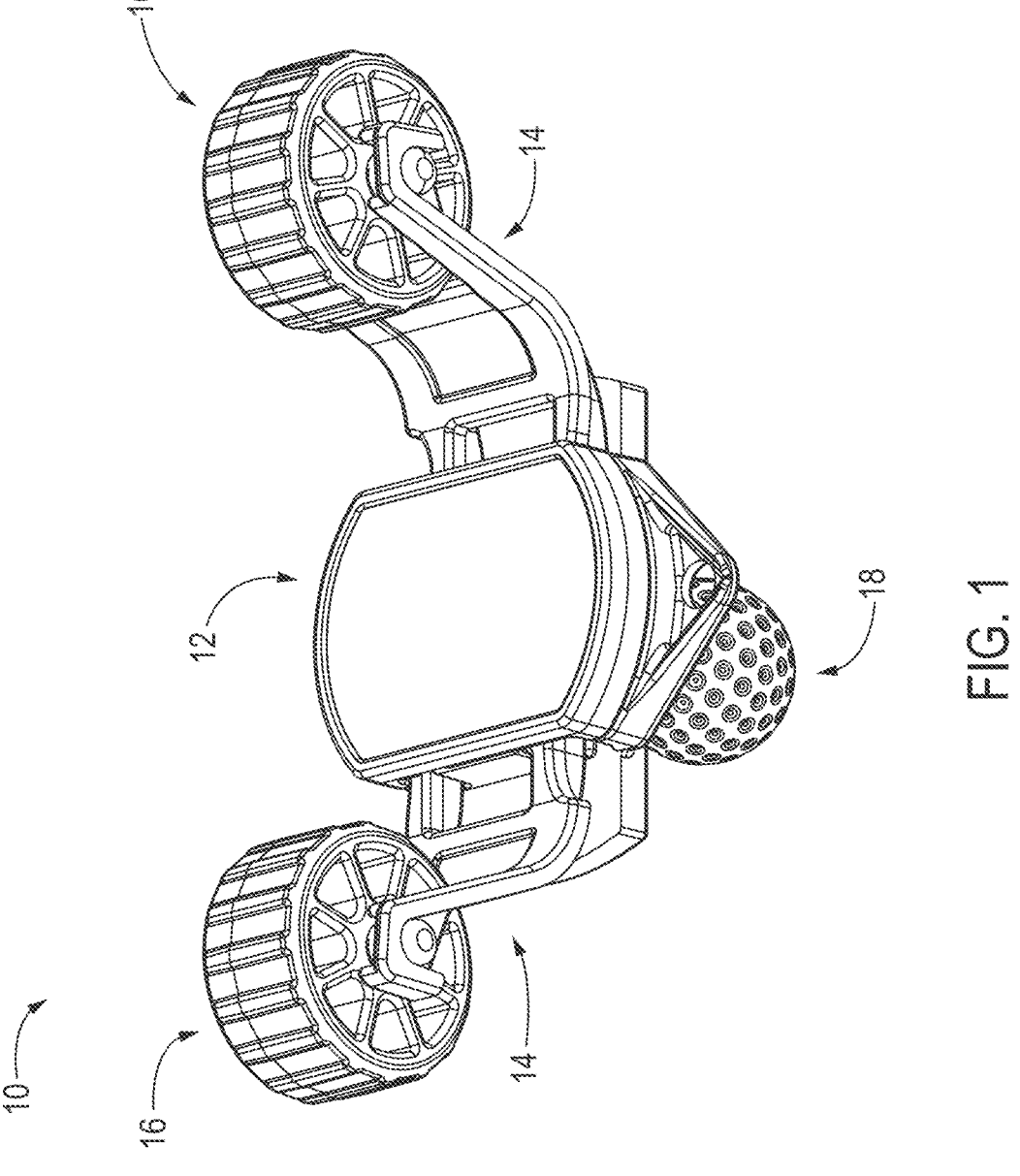
FIG. 1 is a front perspective view of an exemplary embodiment of a phone holder, as seen from the top, wherein the phone holder is in a first closed position
Figures 2, 3:
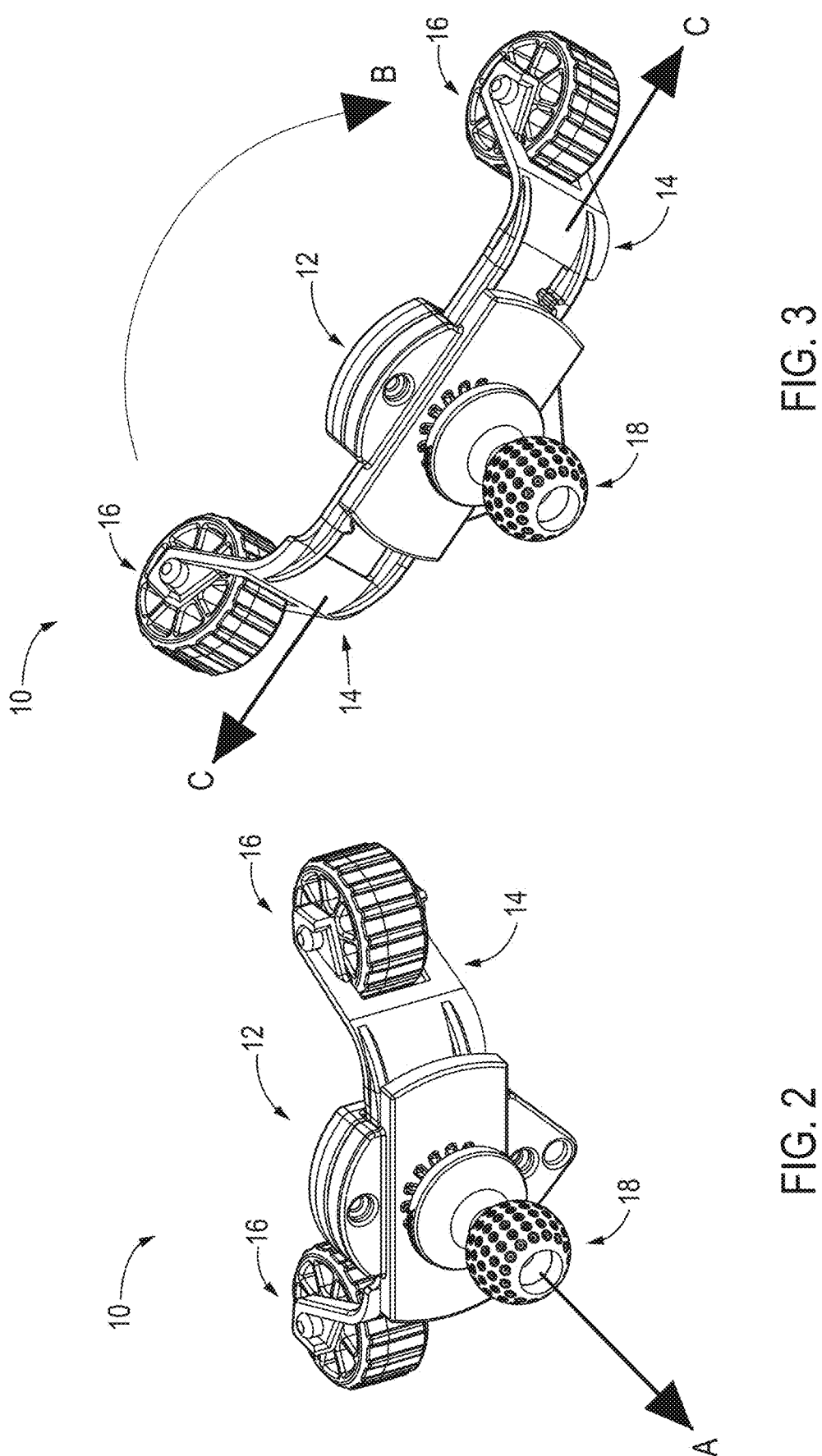
FIG. 2 is a front perspective view of the phone holder shown in FIG. 1, as seen from the bottom.
FIG. 3 is a front perspective view of the phone holder, seen from the bottom, wherein the phone holder is in a second opening position.

With reference to FIG. 1, there is illustrated an exemplary embodiment of a phone holder 10. The phone holder 10 comprises a housing 12 (generally a platform), flexible arms 14 (generally articulatable members) linearly displaceable (generally articulatable) in relation to the housing 12, and wheels 16 (generally interface members) supported for rotation in relation to free ends on the flexible arms 14. The housing 12 is supported in relation to a ball mount 18 (generally a base), subjacent the housing 12. The ball mount 18 may form a part of a ball joint (not shown). The housing 12 is displaceable in relation to the ball mount 18 in a linear direction (opposite directional A when viewing FIG. 2) to separate housing 12 from the ball mount 18 to an operable position to render the flexible arms 14 displaceable. The housing 12 is displaceable in a first rotational direction (e.g., in a clockwise direction B when viewing FIG. 3) to cause linear displacement of the flexible arms 14 (in a direction C when viewing FIG. 3) to a second or open position.

Figures 4, 5:
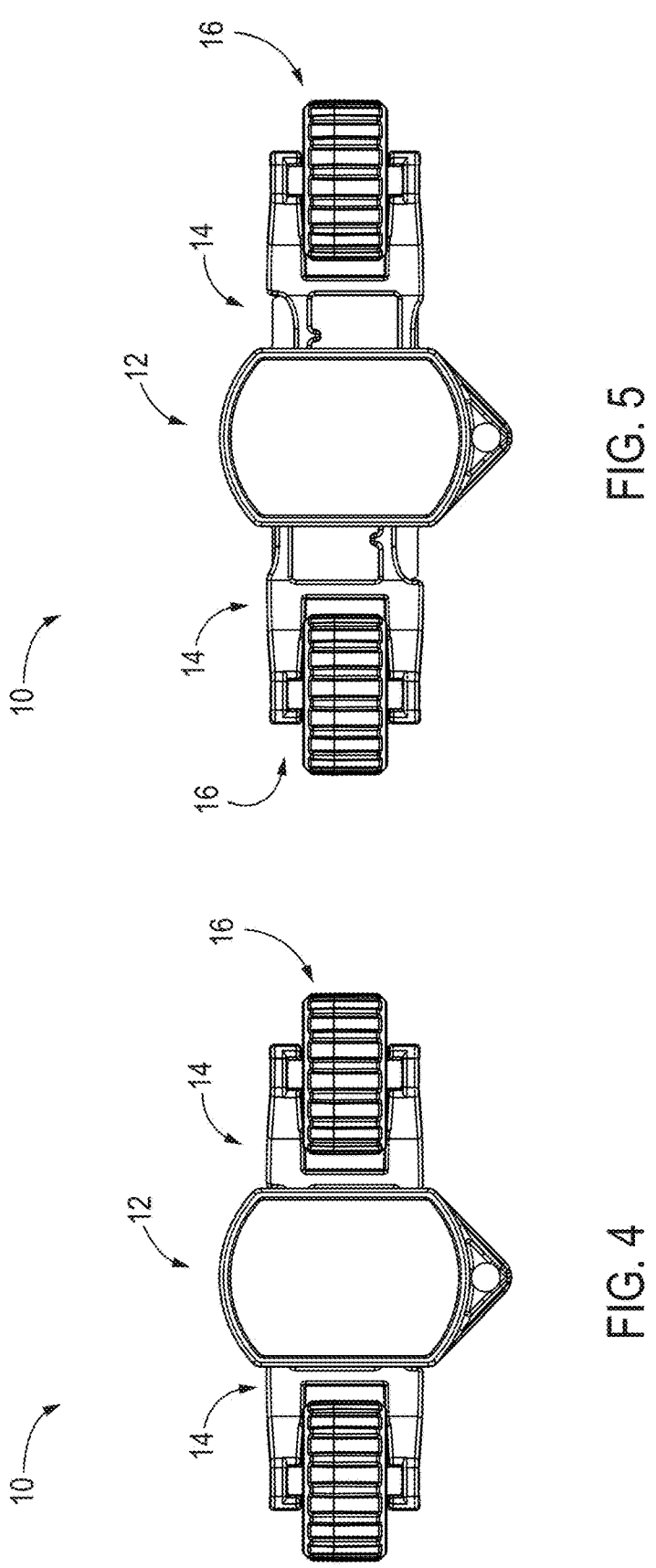
FIG. 4 is a top plan view of the phone holder shown n FIG. 2.
FIG. 5 is a top plan view of the phone holder shown n FIG. 3.

In FIG. 4, the flexible arms 14 shown in the closed position. In FIG. 5, the flexible arms 14 are shown in the open position. In the open position, a phone (not shown) may pass between the wheels and enter into a space beyond the wheels 16 and between the flexible arms 14. Rotating the housing 12 in a second rotational direction, opposite the first direction, causes the flexible arms 14 to move toward one another (back toward the position shown in FIG. 4) until the phone is supported between the flexible arms 14 and held in a fixed relation to the flexible arms 12 by the wheels 16. Rotating the housing 12 in the first direction causes the flexible arms 14 to move away from one another (back toward the position shown in FIG. 5), which allows the phone to the removed from between the flexible arms 14 and beyond the wheels 16.

Figure 7:
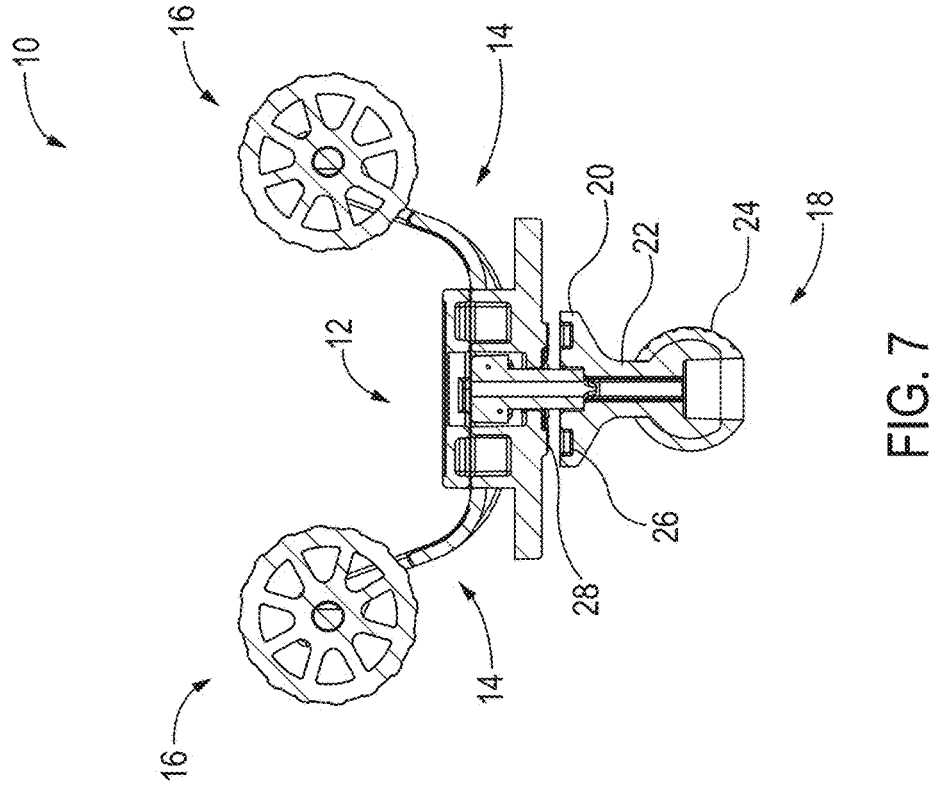
FIG. 7 is a cross-sectional view of the phone holder with the ball mount disengaging the housing to permit the housing to rotate to move the flexible arms.
Figure 6:
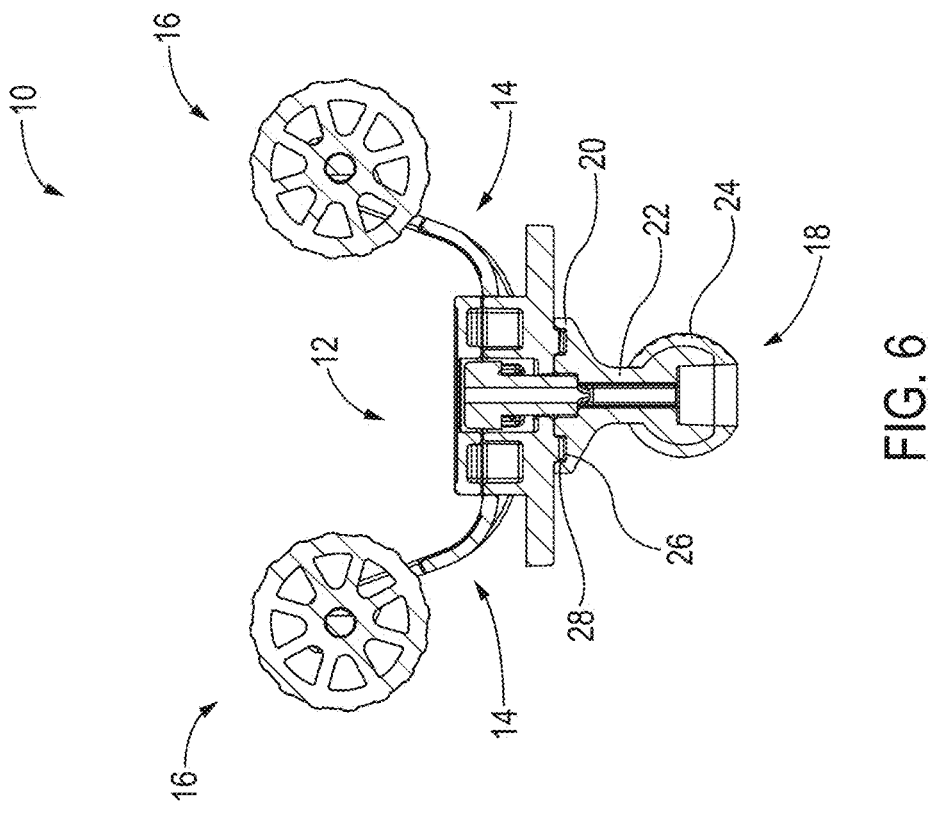
FIG. 6 is a cross-sectional view of the phone holder with a ball mount thereof engaging a housing thereof to prevent the housing from rotating and flexible arms thereof from moving.
Figure 8:
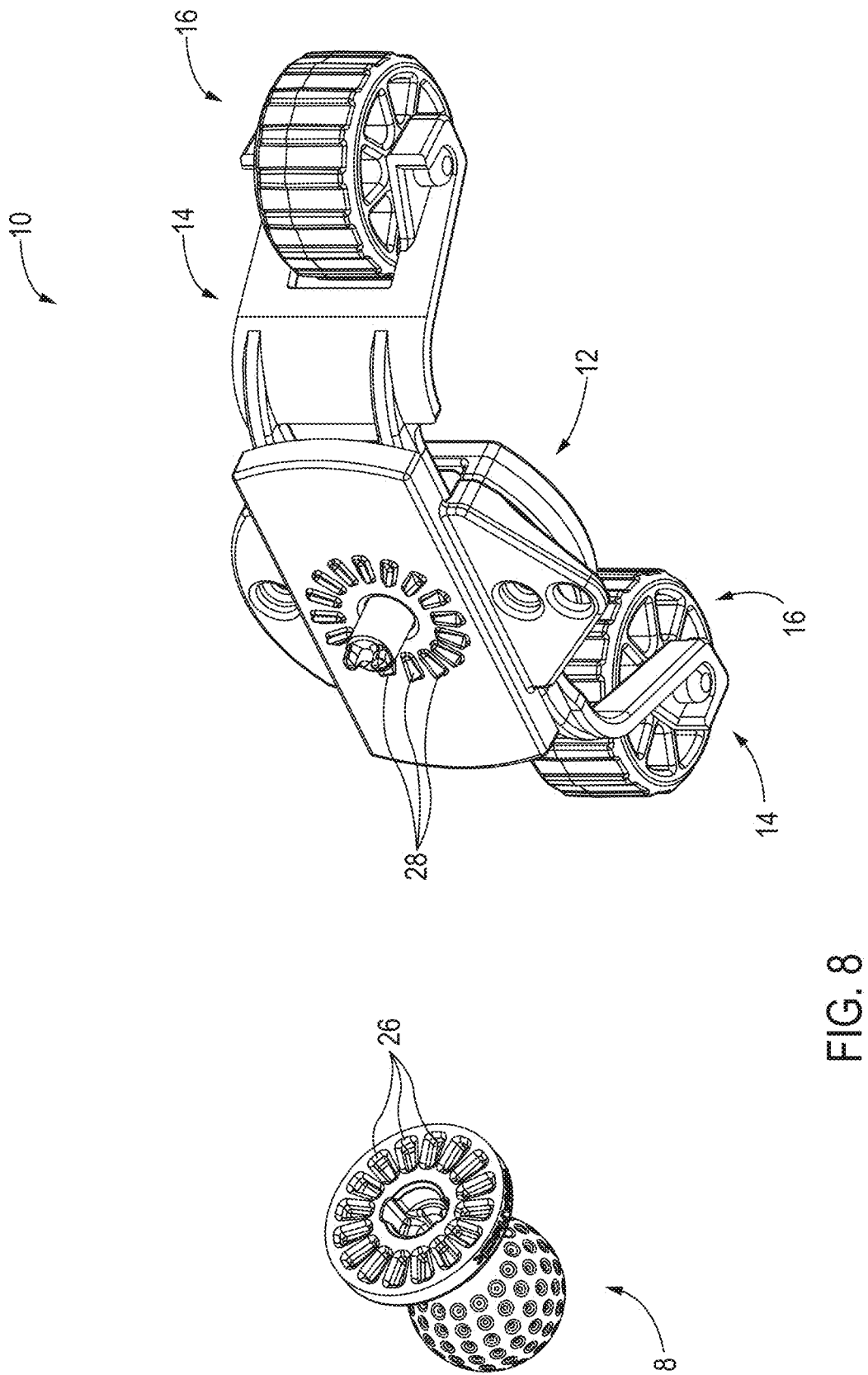
FIG. 8 is a partially exploded, front perspective view of the phone holder, as seen from the bottom, showing the ball mount separate from the housing and cooperating pockets and teeth.

FIGS. 6 and 7 are cross-sectionals view of the phone holder 10. In the illustrated embodiment, the ball mount 18 comprises a base 20, a stem 22 extending from the base 20, and a ball 24 supported in relation to the stem 22. An upper side or surface of the base 20 has recesses or pockets 26. A lower side or surface of the housing 12 has protrusions or teeth 28 that are engageable with the pockets 26. In FIG. 6, the housing 14 is in an inoperable position, wherein the teeth 28 are engaged with the pockets 26 to prohibit the housing 12 from moving rotationally in relation to the ball mount 18, wherein the flexible arms 14 are held in a fixed position against articulation or displacement. In FIG. 7, the housing 14 is in an operable position, wherein the teeth 28 are disengaged from the pockets 26 to permit the housing 12 to move rotationally in relation to the ball mount 18, wherein the flexible arms 14 are free to be articulated or displaced. The pockets 28 and teeth 28 are more clearly shown in FIG. 8.

The teeth 28 are angled, inclined or ramped on a first surface and form a barrier wall or stop on a second surface. This permits the housing 12 to ratchet in relation to the ball mount 18 when rotating the housing 12 in the second rotational direction to cause the flexible arms 14 to move toward one another and the stops prohibit the housing 12 from rotating in the opposite direction to permit the flexible arms 14 to open unless the housing 12 is separated from the ball mount 18. This permits a single-handed operation of the phone holder 10 to hold a phone, which frees a hand to hold the phone in relation to the phone holder 10. In other words, a user may open the flexible arms 14 with one hand by pulling on the housing 12 to separate the housing from the ball mount 18 and insert the phone between the flexible arms 14. Thereafter, with a single hand, the user may rotate the housing 12 in relation to the ball mount 18 against the ramped surfaces of the teeth in a ratcheting fashion until the phone is captured between the flexible arms 14 and by the wheels 16, at which point, the stops prohibit the housing 12 from rotating in an opposite direction to permit the flexible arms 14 to open.

Figure 9:
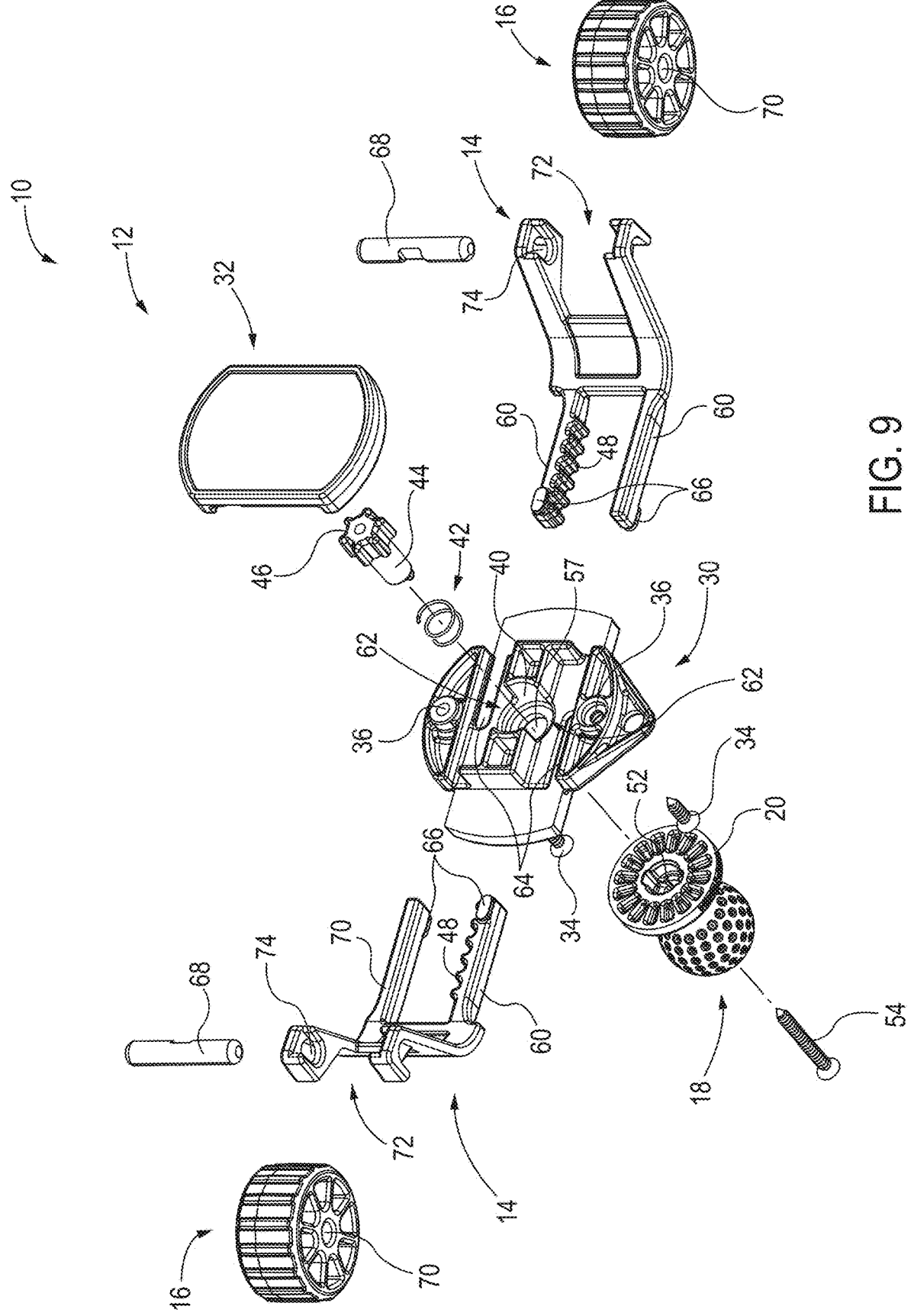
FIG. 9 is an exploded front perspective view of the phone holder, as seen from the top.
Figure 10:
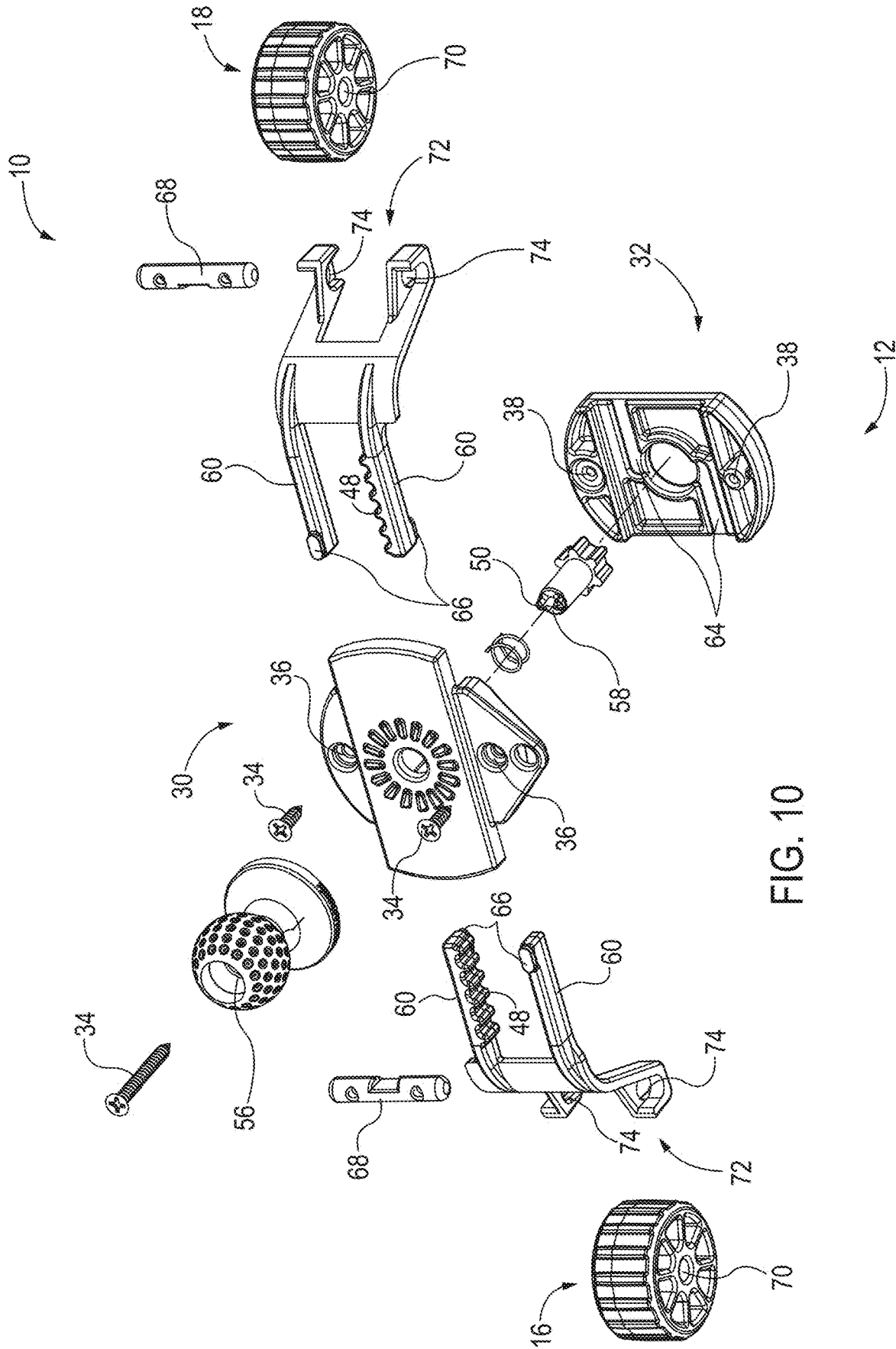
FIG. 10 is an exploded front perspective view of the phone holder, as seen from the bottom.

Now with reference to FIGS. 9 and 10, the housing 12 comprises a base 30 and an enclosure 32. In the illustrated embodiment, the base 30 and the enclosure 32 are joined together by threaded fasteners 34 that pass through through-holes 36 in the base 30 and thread into threaded holes 38 in the enclosure 32. The base 30 comprises a centrally located socket 40 for receiving a helical spring 42, which is seated at a bottom of the socket 40. The spring 42 is sized or dimensioned and configured to receive a threaded sleeve 44, which supports a pinion or circular gear 46, which is engageable with racks or linear gears 48 that in turn are supported in relation to the flexible arms 14. The bottom of the threaded sleeve 44 comprises a key feature 50 that cooperates with a mating key feature 52 in the base 20 of the ball mount 18. The threaded sleeve 44 is fixed in relation to the ball mount 18 by a threaded fastener 54 that passes through a through-hole 56 in the ball mount 18 and a through-hole 57 in the base 30 of the housing 12 and threads into a threaded hole 58 in the threaded sleeve 44. The cooperating key features 50, 52 fix the threaded sleeve 44 against rotation in relation to the ball mount 18, so that upon rotating the housing 12 in relation to the ball mount 18, the circular gear 46 rotates within the housing 12. This causes the circular gear 46, which engages the linear gears 48, to drive the linear gears 48. The linear gears 48 are supported by or form a part of the flexible arms 14 so that as the linear gears 48 are driven, the flexible arms 14 are in turn driven or displaced linearly.

In operation, the spring 42 is normally biased to the inoperable position, rendering the circular gear 46 inoperable against rotation. In other words, the spring 42 urges the housing 12 downward so that the teeth 28 engage the pockets 26 so that the housing 12 cannot rotate in relation to the ball mount 18, thus prohibiting rotation of the circular gear 46. The housing 12 may be displaced upward against a biasing force of the spring 42 to an operable position, rendering the circular gear 46 operable to rotate. In other words, the teeth 28 disengage the pockets 26 so that the housing 12 can rotate in relation to the ball mount 18, thus permitting rotation of the circular gear 46 to drive the linear gears 48 to articulate or displace the flexible arms 14.

In the illustrated embodiment, a pair of legs 60 extend from each one of the flexible arms 14. The linear gears 48 are supporting longitudinally in relation to a respective one of the legs of each pair of legs 60. The linear gears 48 are opposingly disposed and directed inwardly toward the socket 40, which has opposingly disposed lateral openings 62 through which the circular gear 46 engage the linear gears 48. Channels 64 are provided in the base 30 and the enclosure 32. Nodules or protrusions 66 extending from ends of the legs 60 travel in the channels 64, which functions to guide the legs 60 along a linear path as the legs 60 are driven by the linear gears 48, which are driven by the circular gear 46, which in turn, is driven by rotating the housing 12 in relation to the ball mount 18. This drive arrangement is more clearly shown in FIG. 11. Clearly, the flexible arms 14 are displaceable simultaneously toward each other to The wheels 16 are supported in relation to free ends of the flexible arms 14 by pins 68. In the illustrated embodiment, the pins 68 are slightly larger than hubs 70 of the wheels 16 so that the pins 68 may be captured in the hubs 70 upon application of force. The free ends of the flexible arms 14 comprise a fork 72 with aligning holes 74, which support the pins 68, and more particularly, ends of the pins 68 extending from opposing sides of the wheels 16. To be clear, the hub 70 or each wheel 16 is aligned with the aligning holes 74 in a respective one of each fork 72, a corresponding one of the pins 68 passes through a first one of the holes 74, is forced through the hub 70, and enters into a second one of the holes 74 on an opposite side of the wheel 16, until the ends of the pin 68 are supported by the aligning holes 74. The pin 74 fits loosely with the aligning holes 74 so that the pin 74 is rotatable in relation to the aligning holes 74. This loose fit in turn permits the wheel 16 to rotate by virtue of the rotatable pin 74. The wheels 16 may be formed at least in part of a thermoplastic rubber, such as Thermoplastic Vulcanizate sold under the trademark SANTOPRENE, which behaves like a rubber but may be processed like a thermoplastic.

Figure 11:
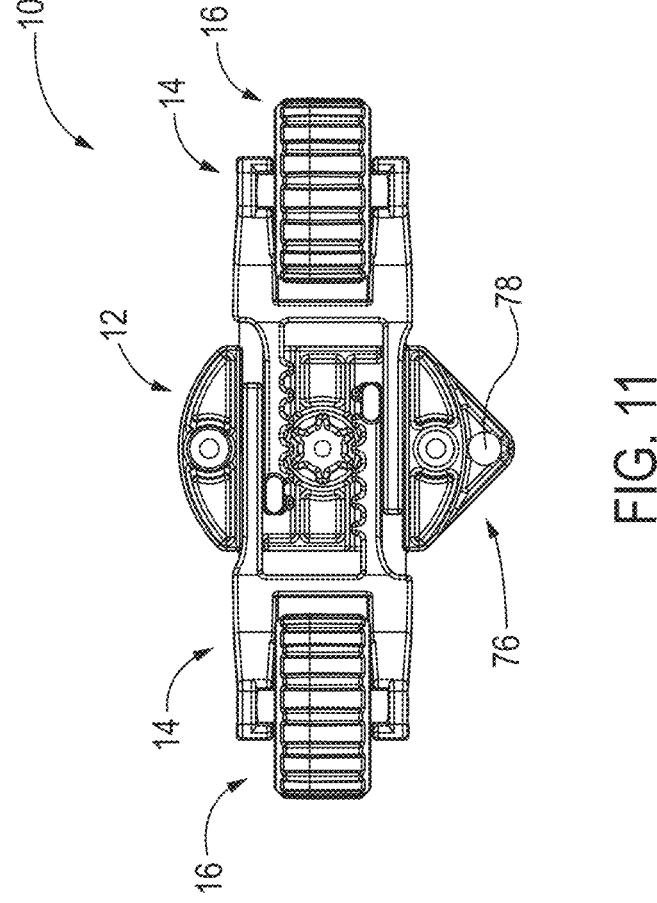
FIG. 11 is a top plan view of the phone holder and an enclosure of the housing removed to show a drive arrangement therein.

As shown in FIG. 11, the phone holder 10 may be comprised of a tab 76 comprising a hole 78 for receiving a tether (not shown), which may be supported in relation to a phone for tethering the phone to the phone holder 10 to mitigate the risk that the phone will become inadvertently detached from the phone holder 10.

It should be appreciated that one of the flexible arms 14 may be fixed and one of the flexible arms 14 may be displaceable in relation to the fixed flexible arm 14.

It should be noted that orientational terms used throughout this description are with reference to the orientation of the invention and component parts thereof as presented in the accompanying drawings, which is subject to change. Therefore, orientational terms are used for semantic purposes, and do not limit the invention or its component parts in any particular way.

While the invention and components parts thereof may have been described herein in terms of certain components being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

10 phone holder
12 platform or housing
14 articulatable members or flexible arms
16 interface members or wheels
18 base or ball mount
20 base
22 stem
24 ball
26 recesses of pockets
28 protrusions or teeth
30 base
32 enclosure
34 threaded fasteners
36 through-holes
38 threaded holes
40 socket
42 helical spring
44 threaded sleeve
46 pinion or circular gear
48 racks or linear gears
50 key feature
52 key feature
54 threaded fastener
56 through-hole
57 through-hole
58 threaded hole
60 legs
62 opposingly disposed lateral openings
64 channels
66 nodules or protrusions
68 pins
70 hubs
72 fork
74 aligning holes
76 tab
78 hole

What is claimed is:

1. A phone holder comprising:
a platform;
a base subjacent to the platform, the platform being rotatable relative to the base about an axis;

a circular gear operatively disposed between the platform and the base and configured to be driven by rotation of the platform relative to the base;
an articulatable member supported for linear movement in relation to the platform, the articulatable member having a free end, and
an interface member supported in relation to the articulatable member, the interface member being configured to contact a phone to secure the phone in relation to the platform.

2. The phone holder of claim 1, wherein the platform being displaceable in relation to the base between an inoperative position in which the articulatable member is held in a fixed position against articulation, and an operable position, in which the articulatable member is free to be articulated.

3. The phone holder of claim 1, further comprising a linear gear operably coupled to the articulatable member linear gear being driven by the circular gear to articulate the articulatable members.

4. The phone holder of claim 1, wherein the articulatable member is one of at least two articulatable members, and wherein the interface member is one of at least two interface members, each supported in relation to the free end of a respective articulatable member.

5. The phone holder of claim 4, wherein the articulatable members are configured to be articulated simultaneously toward each other so the interface members each may contact the phone and secure the phone therebetween.

6. The phone holder of claim 4, further comprising a linear gear for each articulatable member, the linear gears being simultaneously driven by the circular gear to articulate the articulatable members.

7. A phone holder comprising
a platform;
at least two articulatable members, at least one of the articulating members being supported in relation to the platform, each one of the articulatable members having a free end, and
at least two interface members each supported in relation to the free end of a respective one of the articulatable member, the interface member being configured to contact a phone to secure the phone in relation to the platform, and
a base subjacent to the platform, a circular gear driven by rotating the platform in relation to the base.

8. The phone holder of claim 7, further comprising a ball extending downward in relation to the base, the ball being a component part of a ball and socket configuration.

9. The phone holder of claim 8, further comprising a spring supported in relation to the platform and the base, the spring being normally biased to urge the platform to a position rendering the circular gear inoperable against rotation, the platform being displaceable against the biasing force of the spring to a position rending the circular gear operable to rotate to drive the linear gears to articulate the articulatable members.

10. The phone holder of claim 1, wherein rotation of the platform causes rotation of the circular gear relative to the base.

11. The phone holder of claim 1, wherein the circular gear is operatively disposed between the platform and the base such that rotation of the platform about an axis directly causes rotation of the circular gear relative to the base, and wherein the circular gear is engaged with a linear gear operatively coupled to the articulatable member to articulate the articulatable member in response to rotation of the platform.

* * * * *